(12) United States Patent
Kunze

(10) Patent No.: US 11,417,107 B2
(45) Date of Patent: Aug. 16, 2022

(54) STATIONARY VISION SYSTEM AT VEHICLE ROADWAY

(71) Applicant: Magna Electronics Inc., Auburn Hills, MI (US)

(72) Inventor: Norbert Kunze, Diez (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 365 days.

(21) Appl. No.: 16/278,965

(22) Filed: Feb. 19, 2019

(65) Prior Publication Data

US 2019/0258872 A1 Aug. 22, 2019

Related U.S. Application Data

(60) Provisional application No. 62/632,240, filed on Feb. 19, 2018.

(51) Int. Cl.
| | | |
|---|---|---|
| *G06K 9/00* | (2022.01) | |
| *G01S 13/91* | (2006.01) | |
| *G01S 13/89* | (2006.01) | |
| *G05D 1/02* | (2020.01) | |
| *G06V 20/54* | (2022.01) | |

(52) U.S. Cl.
CPC .............. *G06V 20/54* (2022.01); *G01S 13/89* (2013.01); *G01S 13/91* (2013.01); *G05D 1/0251* (2013.01); *G05D 2201/0213* (2013.01); *G06V 2201/08* (2022.01)

(58) Field of Classification Search
CPC ...... G01S 13/865; G01S 13/867; G01S 13/89; G01S 13/91; G05D 1/0251; G05D 2201/0213; G06K 2209/23; G06K 9/00201; G06K 9/00785

See application file for complete search history.

(56) References Cited

U.S. PATENT DOCUMENTS

| | | |
|---|---|---|
| 4,088,937 A | 5/1978 | Uchida et al. |
| 5,550,677 A | 8/1996 | Schofield et al. |
| 5,595,271 A | 1/1997 | Tseng |
| 5,670,935 A | 9/1997 | Schofield et al. |
| 5,760,962 A | 6/1998 | Schofield et al. |
| 5,796,094 A | 8/1998 | Schofield et al. |
| 5,877,897 A | 3/1999 | Schofield et al. |
| 5,949,331 A | 9/1999 | Schofield et al. |
| 6,129,411 A | 10/2000 | Neff et al. |
| 6,201,642 B1 | 3/2001 | Bos |
| 6,396,397 B1 | 5/2002 | Bos et al. |

(Continued)

*Primary Examiner* — Bobbak Safaipour
(74) *Attorney, Agent, or Firm* — Honigman LLP

(57) ABSTRACT

A stationary vision system at a road along which vehicles travel includes an imaging sensor disposed at the road and having a field of view that encompasses a portion of the road. A wireless communication device is operable to wirelessly communicate with vehicles traveling along the road. A control includes a data processor operable to process image data captured by the image sensor. The control is operable to communicate with vehicles traveling along the road via the wireless communication device. The control, responsive to processing of image data captured by the imaging sensor, generates a three dimensional (3D) model of the portion of the road encompassed by the field of view of the imaging sensor. The control transmits the 3D model to vehicles traveling along the road.

19 Claims, 1 Drawing Sheet

(56) References Cited

U.S. PATENT DOCUMENTS

| | | |
|---|---|---|
| 6,405,132 B1 | 6/2002 | Breed et al. |
| 6,636,258 B2 | 10/2003 | Strumolo |
| 6,690,268 B2 | 2/2004 | Schofield et al. |
| 6,693,517 B2 | 2/2004 | McCarthy et al. |
| 6,975,246 B1 | 12/2005 | Trudeau |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,881,496 B2 | 2/2011 | Camilleri et al. |
| 8,686,873 B2 * | 4/2014 | Demirdjian .......... G08G 1/164 348/148 |
| 8,892,345 B2 | 11/2014 | Arcot et al. |
| 9,218,001 B2 | 12/2015 | Lee |
| 9,406,114 B2 * | 8/2016 | Li .................. H04N 5/23206 |
| 9,478,129 B1 | 10/2016 | Kothari et al. |
| 9,729,636 B2 | 8/2017 | Koravadi et al. |
| 10,109,198 B2 * | 10/2018 | Qiu ..................... G01S 17/86 |
| 10,796,572 B2 * | 10/2020 | Farr ..................... G05D 1/0287 |
| 11,025,865 B1 * | 6/2021 | Medasani ............. H04N 7/181 |
| 11,205,012 B2 * | 12/2021 | Viente ............... G01C 21/3602 |
| 2003/0095039 A1 | 5/2003 | Shimomura et al. |
| 2006/0254142 A1 | 11/2006 | Das et al. |
| 2007/0032245 A1 | 2/2007 | Alapuranen |
| 2009/0033474 A1 | 2/2009 | Chen |
| 2010/0085171 A1 | 4/2010 | Do |
| 2011/0032119 A1 | 2/2011 | Pfeiffer et al. |
| 2011/0112720 A1 | 5/2011 | Keep et al. |
| 2012/0062743 A1 | 3/2012 | Lynam et al. |
| 2012/0065858 A1 | 3/2012 | Nickolaou et al. |
| 2012/0218412 A1 | 8/2012 | Dellantoni et al. |
| 2013/0116859 A1 | 5/2013 | Ihlenburg et al. |
| 2013/0222592 A1 | 8/2013 | Gieseke |
| 2013/0342333 A1 | 12/2013 | Hutchings |
| 2014/0032091 A1 | 1/2014 | Arcot et al. |
| 2014/0063196 A1 * | 3/2014 | Daniel .................. G08G 1/096 348/46 |
| 2014/0088796 A1 | 3/2014 | Lee |
| 2014/0195068 A1 | 7/2014 | Boss et al. |
| 2014/0195138 A1 | 7/2014 | Stelzig et al. |
| 2014/0218529 A1 | 8/2014 | Mahmoud et al. |
| 2014/0222323 A1 | 8/2014 | Purushothaman et al. |
| 2014/0253345 A1 | 9/2014 | Breed |
| 2014/0309806 A1 | 10/2014 | Ricci |
| 2014/0309864 A1 | 10/2014 | Ricci |
| 2014/0334684 A1 * | 11/2014 | Strimling ................. G07C 9/28 382/104 |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0228188 A1 | 8/2015 | Macfarlane et al. |
| 2015/0232065 A1 | 8/2015 | Ricci et al. |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2016/0260328 A1 | 9/2016 | Mishra et al. |
| 2016/0358477 A1 | 12/2016 | Ansari |
| 2017/0015277 A1 * | 1/2017 | Lisi ........................ B60R 25/33 |
| 2017/0264890 A1 * | 9/2017 | Gorilovsky ........... B66B 13/303 |
| 2017/0287335 A1 * | 10/2017 | Ansari .................. B60W 40/04 |
| 2017/0345100 A1 * | 11/2017 | Bowie ................... G06Q 40/08 |
| 2017/0371340 A1 * | 12/2017 | Cohen ..................... G06T 7/277 |
| 2018/0032822 A1 * | 2/2018 | Frank ..................... H04N 13/20 |
| 2019/0176794 A1 * | 6/2019 | Pinto, IV ................ B60T 7/22 |
| 2019/0220678 A1 * | 7/2019 | Guo ........................ G08G 1/04 |
| 2019/0228571 A1 * | 7/2019 | Atsmon ................ G01C 11/04 |
| 2019/0272389 A1 * | 9/2019 | Viente ............... G01C 21/3602 |
| 2019/0302764 A1 * | 10/2019 | Smith ................ B65G 69/2882 |
| 2021/0287536 A1 * | 9/2021 | Siltanen ............. G01C 21/3461 |

\* cited by examiner

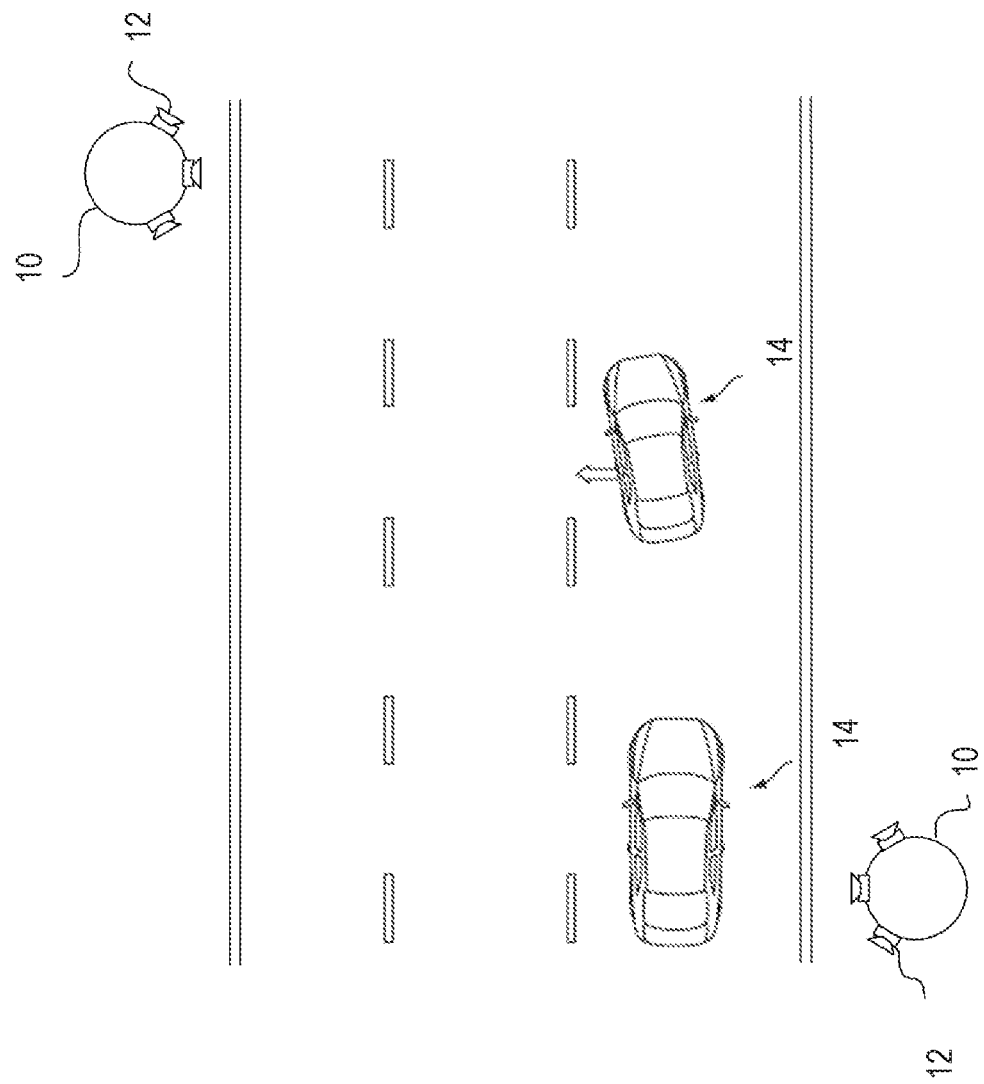

STATIONARY VISION SYSTEM AT VEHICLE ROADWAY

CROSS REFERENCE TO RELATED APPLICATION

The present application claims the filing benefits of U.S. provisional application Ser. No. 62/632,240, filed Feb. 19, 2018, which is hereby incorporated herein by reference in its entirety.

FIELD OF THE INVENTION

The present invention relates generally to a stationary vision system and, more particularly, to a stationary vision system that utilizes one or more cameras and radar to assist vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a stationary vision system or imaging system that utilizes one or more cameras or imaging sensors disposed at or near or along a road or roadway to capture image data representative of images of a nearby roadway, and includes a wireless communication module to wirelessly communicate with vehicles traveling on the nearby roadway. The system also includes a control that includes an image processor that processes image data captured by the imaging sensors and communicates with nearby vehicles via the wireless communication module. Responsive to image processing by the processor of image data captured by the imaging sensor, the control creates a three dimensional (3D) model of the environment within the field of view of the imaging sensor. Responsive to a presence of a vehicle on the nearby roadway, the control transmits the 3D model to the vehicle.

These and other objects, advantages, purposes and features of the present invention will become apparent upon review of the following specification in conjunction with the drawings.

BRIEF DESCRIPTION OF THE DRAWINGS

FIG. 1 is a plan view of stationary vision systems in accordance with the present invention.

DESCRIPTION OF THE PREFERRED EMBODIMENTS

A stationary or roadside vision system and/or object detection system and/or alert system operates to capture image data exterior of the vehicle and may process the captured image data to display images and to detect objects at or near the system and in the predicted path of a vehicle, such as to assist a driver of the vehicle or an autonomous control of the vehicle in maneuvering the vehicle. The vision system includes an image processor or image processing system that is operable to receive image data from one or more cameras.

Referring now to the drawings and the illustrative embodiments depicted therein, a stationary vision system 10 includes at least one exterior viewing imaging sensor or camera or radar sensor 12 disposed along a road, with the camera or sensor capturing data representative of the area at or surrounding the stationary vision system, including a road or roads and vehicles 14 traveling along the road or roads (FIG. 1). The vision system 10 includes a control or electronic control unit (ECU) or processor that is operable to process data captured by the camera or cameras or sensors and may detect objects or the like present in the field of view of one or more cameras. The data transfer or signal communication from the camera to the ECU may comprise any suitable data or communication link. The system may have a plurality of units or modules disposed along the road, with each unit or module comprising one or more imaging sensors or cameras (such as three cameras) having respective fields of view along the portion of the road at which the unit or module is disposed. Each unit or module may also include a communication module or unit and a control that has a data processor that processes image data captured by the imaging sensors or cameras (and optionally a data processor that processes sensor data captured by a plurality of radar sensors or the like at or near the unit or module).

In accordance with the present invention, the stationary vision systems are installed along roads or streets and may be implemented instead of or in conjunction with using one or more expensive vision systems in each vehicle. This provides many advantages. For example, it is much easier to calculate a three-dimensional (3D) model of the environment (including the roadway and structure and infrastructure and non-moving objects (including parked vehicles, signs, trees, etc.) disposed at or along the roadway) around every stationary system as the stationary system does not need to account for its own movement. The range of the stationary vision system can be greatly reduced from the systems required in moving vehicles, as the stationary systems can be placed frequently and there are benefits to overlapping detection areas (for example, in a neighborhood). The system of the present invention calculates a 3D model of traffic in short frequencies (as the environment has minimal changes) and places the traffic into a fixed 3D model of the environment. This is possible because only the moving objects (e.g., vehicles and pedestrians) are changing their positions, with the sensors and surrounding scene or environment being fixed or non-moving.

The changing 3D data composites (static environment and changed positions of moving bodies) can be transmitted to every vehicle (such as to an ECU of each vehicle) moving inside the related environment (e.g., to each vehicle in the environment that is also equipped with a communication system suitable for receiving the communication from the stationary system, such as a vehicle to vehicle (V2V) or vehicle to infrastructure (V2X) communication protocol or the like). For example, the imaging sensor and control and communication system may be a component of a vehicle to infrastructure (V2X) system that, for example, communicates the 3D model and other moving object or moving vehicle information to a server via the cloud, whereby the server communicates to the vehicles that are traveling along the road. A vehicle (or vehicle-based ECU) receiving this information then places itself into the 3D model and responds accordingly. The vehicle no longer has to identify every moving and static object by itself anymore, as the information is provided by the outside stationary vision systems via use of, for example, radar and/or lidar and imaging sensors or cameras. To assist the vehicle in locating its location inside the 3D model, an identifier (for example, a laser readable sign or tag) may be applied to the vehicle (such as at an exterior portion of the vehicle that is viewable by the stationary camera or sensor as the vehicle is maneuvered along the road past or near the stationary camera or sensor). The identifier may include a code that is sent to all vehicles in the related 3D model. As each vehicle has a unique identifier, this identifier could be read by the systems of all of the nearby or linked vehicles and evaluated to determine the respective vehicle's position within the 3D model. In such a way, the vehicle may navigate along the street and pass safely by obstacles and other vehicles, such as via autonomous control of the vehicle utilizing various exterior sensors and processors, such as one or more processors processing image data captured by cameras of the vehicle, radar data sensed by radar sensors of the vehicle, and/or lidar data sensed by lidar sensors of the vehicle and/or the like.

In accordance with the present invention, the stationary system may have the camera (and optionally the communication module and controller) mounted at a location higher than a typical vehicle-mounted vision system and thus have a better view than the street level view of the vehicle. Due to this higher location, eye safety issues with lasers are less relevant, as the distance between the eyes and the laser is larger and the laser energy is reduced proportionally by the distance. Additionally, lower energy lasers may be used (for example, Class 1), as the distance between stationary systems is reduced and overlap from each station is increased.

Because of the fixed locations of the stationary systems within a mostly static environment, the monitored range of the vehicle may be much larger than with typical vision systems installed in the vehicle itself. The limiting factor on the monitored range is the size of the 3D model that is transmitted to the vehicle. The 3D model may also be used as input for a traffic forecast to optimize the traffic and to improve navigation.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system of the present invention senses the environment along a road and generates a 3D model of the environment within a field of view of the imaging sensor. A plurality of sensors or cameras may be disposed along a road to generate a continuous 3D model along the road. As vehicles travel along the road, the system of the present invention communicates the 3D model of that road and its surroundings to one of the vehicles so that vehicle can determine its location in the 3D model and can maneuver (such as via autonomous control of the steering and accelerating and braking of the vehicle) along the road in accordance with the pre-generated 3D model. The system of the present invention also determines the vehicle and other vehicles and/or pedestrians that enter the field of view of the imaging sensor(s) and can communicate that information to the vehicles traveling along the road (such as when those vehicles enter the scene encompassed by the stationary system and/or when those vehicles are within range of the wireless communication system of the stationary system). The vehicle control systems of the linked vehicles thus receive information about the surroundings of the road on which the vehicles are traveling, including information about objects or vehicles or hazards that are outside of the field of sensing of the vehicle-based sensors, yet within the field of sensing of the stationary sensing system or vision system. The vehicle control system of a given vehicle may receive the information and control the vehicle functions (e.g., steering and braking) responsive at least in part to the received information.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140;

US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may communicate with other systems in a variety of ways, such as via a vehicle-to-infrastructure communication system or the like. Such vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A stationary vision system disposed at a road along which vehicles travel, the stationary vision system comprising:
an imaging sensor disposed at a road along which vehicles travel and having a field of view that encompasses a portion of the road;
a wireless communication device operable to wirelessly communicate with vehicles traveling along the road;
a control comprising a data processor operable to process image data captured by the image sensor;
wherein the control is operable to communicate with vehicles traveling along the road via the wireless communication device;
wherein the control, responsive at least in part to processing of image data captured by the imaging sensor, generates a three dimensional (3D) model, the 3D model comprising (i) a static 3D model of the environment at and along the portion of the road encompassed by the field of view of the imaging sensor and (ii) a dynamic 3D model of moving objects at and along the portion of the road encompassed by the field of view of the imaging sensor;
wherein the control transmits the 3D model to vehicles traveling along the road; and
wherein the control transmits the 3D model to a controller of a determined vehicle, and wherein the controller of the determined vehicle at least in part controls the determined vehicle along the road at least in part responsive to the transmitted 3D model.

2. The stationary vision system of claim 1, wherein the control, responsive to determination of presence of the determined vehicle traveling along the road, uniquely identifies the vehicle.

3. The stationary vision system of claim 2, wherein the control uniquely identifies the determined vehicle by identifying a unique identifier disposed at the vehicle.

4. The stationary vision system of claim 3, wherein the unique identifier disposed on the vehicle comprises a laser-readable tag at an exterior portion of the vehicle.

5. The stationary vision system of claim 2, wherein, responsive to identifying the vehicle and based on the unique identifier of the vehicle, the control determines a location of the vehicle in the 3D model relative to static elements of the static 3D model and transmits the determined location of the vehicle in the 3D model to the determined and identified vehicle.

6. The stationary vision system of claim 1, wherein the imaging sensor is one of a plurality of imaging sensors disposed at and along the road and having respective fields of view of the road.

7. The stationary vision system of claim 6, wherein each imaging sensor of the plurality of imaging sensors has a field of view that overlaps the field of view of at least one adjacent imaging sensor of the plurality of imaging sensors.

8. The stationary vision system of claim 1, comprising a plurality of radar sensors disposed at the road and having fields of sensing that encompass the road, wherein the control generates the 3D model in part responsive to processing of data captured by the radar sensors.

9. A stationary vision system disposed at a road along which vehicles travel, the stationary vision system comprising:
an imaging sensor disposed at a road along which vehicles travel and having a field of view that encompasses a portion of the road;
a wireless communication device operable to wirelessly communicate with vehicles traveling along the road;
a control comprising a data processor operable to process image data captured by the image sensor;
wherein the control is operable to communicate with vehicles traveling along the road via the wireless communication device;
wherein the control, responsive at least in part to processing of image data captured by the imaging sensor, generates a three dimensional (3D) model, the 3D model comprising (i) a static 3D model of the environment at and along the portion of the road encompassed by the field of view of the imaging sensor and (ii) a dynamic 3D model of moving objects at and along the portion of the road encompassed by the field of view of the imaging sensor;

wherein the control transmits the 3D model to vehicles traveling along the road; and wherein the control, responsive to determination of presence of a plurality of vehicles traveling along the road, uniquely identifies each of the vehicles, and wherein the control, based on the unique identifiers of each vehicle, determines locations of each of the vehicles in the 3D model relative to static elements of the static 3D model and transmits the determined locations of the vehicles in the 3D model to the determined and identified vehicles.

10. The stationary vision system of claim 9, wherein the control transmits the 3D model and determined locations of the vehicles in the 3D model to a controller of each of the determined and identified vehicles, and wherein the controller of a respective vehicle at least in part controls that respective vehicle along the road responsive at least in part to the transmitted 3D model and the determined location of that respective vehicle relative to static elements in the static 3D model.

11. A stationary vision system disposed at a road along which vehicles travel, the stationary vision system comprising:

a plurality of imaging sensors disposed along a road along which vehicles travel and having respective fields of view that encompass a respective portion of the road and the environment at the respective portion of the road;

wherein each imaging sensor of the plurality of imaging sensors has a field of view that overlaps the field of view of at least one adjacent imaging sensor of the plurality of imaging sensors;

a wireless communication device operable to wirelessly communicate with vehicles traveling along the road;

a control comprising a data processor operable to process image data captured by the image sensors;

wherein the control is operable to communicate with vehicles traveling along the road via the wireless communication device;

wherein the control, responsive at least in part to processing of image data captured by the imaging sensors, generates a three dimensional (3D) model of the environment at and along the portions of the road encompassed by the fields of view of the imaging sensors;

wherein the control, responsive to determination of presence of a vehicle traveling along the road, transmits the 3D model to the determined vehicle, determines, based on a unique identifier of the vehicle, a location of the vehicle in the 3D model relative to static elements of the 3D model and transmits the determined location of the vehicle in the 3D model to the determined vehicle; and wherein a controller of the determined vehicle at least in part controls the determined vehicle along the road at least in part responsive to the transmitted 3D model and transmitted location of the vehicle in the 3D model.

12. The stationary vision system of claim 11, wherein the control, responsive to determination of the presence of the vehicle traveling along the road, uniquely identifies the vehicle.

13. The stationary vision system of claim 12, wherein the control uniquely identifies the determined vehicle by identifying a unique identifier disposed at the vehicle.

14. The stationary vision system of claim 11, comprising a plurality of radar sensors disposed at the road and having fields of sensing that encompass the road, wherein the control generates the 3D model in part responsive to processing of data captured by the radar sensors.

15. A stationary vision system disposed at a road along which vehicles travel, the stationary vision system comprising:

a plurality of imaging sensors disposed along a road along which vehicles travel and having respective fields of view that encompass respective portions of the road and the environment at the respective portion of the road;

a plurality of radar sensors disposed along the road and having respective fields of sensing that encompass respective portions of the road and the environment at the respective portion of the road;

a wireless communication device operable to wirelessly communicate with vehicles traveling along the road;

a control comprising a data processor operable to process image data captured by the image sensor;

wherein the control is operable to communicate with controllers of vehicles traveling along the road via the wireless communication device;

wherein the control, responsive at least in part to processing of image data captured by the imaging sensor, generates a three dimensional (3D) model, the 3D model comprising (i) a static 3D model of the environment at and along the portion of the road encompassed by the field of view of the imaging sensor and (ii) a dynamic 3D model of moving objects at and along the portion of the road encompassed by the field of view of the imaging sensor;

wherein the control, responsive to determination of presence of a vehicle traveling along the road, uniquely identifies the vehicle and transmits the 3D model to the controller of the determined and identified vehicle; and wherein the controller of the determined vehicle at least in part controls the determined vehicle along the road at least in part responsive to the transmitted 3D model.

16. The stationary vision system of claim 15, wherein the control uniquely identifies the determined vehicle by identifying a unique identifier disposed at the vehicle.

17. The stationary vision system of claim 16, wherein the unique identifier disposed on the vehicle comprises a laser-readable tag at an exterior portion of the vehicle.

18. The stationary vision system of claim 15, wherein, responsive to identifying the vehicle, the control, based on a unique identifier of the vehicle, determines a location of the vehicle in the 3D model relative to static elements of the static 3D model and transmits the determined location of the vehicle in the 3D model to the determined and identified vehicle.

19. The stationary vision system of claim 15, wherein the control, responsive to determination of the presence of a plurality of vehicles traveling along the road, uniquely identifies each of the vehicles, and wherein the control, based on the unique identifiers of the vehicles, determines locations of each of the vehicles in the 3D model relative to static elements of the static 3D model and transmits the determined locations of the vehicles in the 3D model to the respective controllers of the determined and identified vehicles, and wherein the controller of a respective vehicle at least in part controls that respective vehicle along the road responsive at least in part to the transmitted 3D model and the determined locations of the vehicles in the 3D model.

* * * * *